Figures 1, 2, 3, 4:
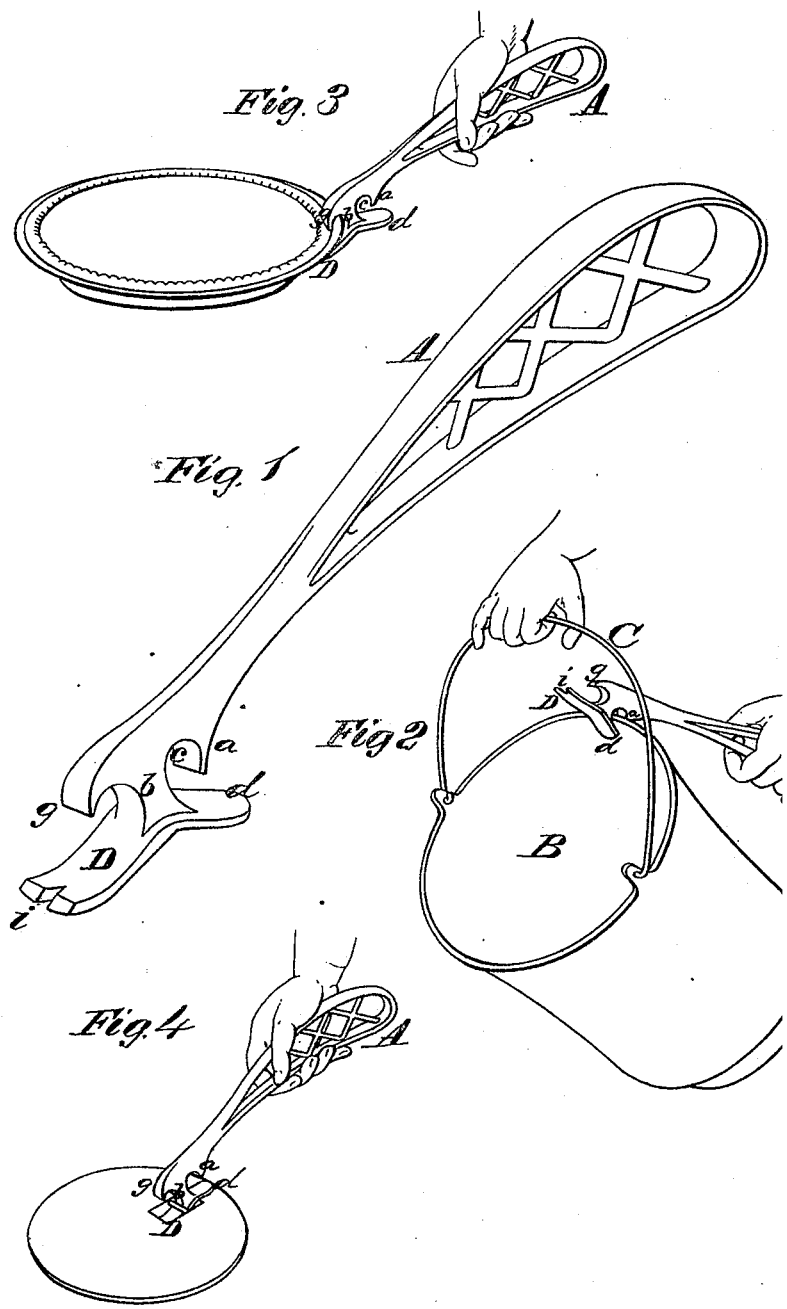

L. S. HOYT.
Stove-Implements.

No. 163,659. Patented May 2

WITNESSES
Villette Anderson.
E. H. Bates

Lewis &
Chipman

THE GRAPHIC CO.PHOTO-LITH.39 & 41 PARK PLACE, N.Y.

UNITED STATES PATENT OFFICE.

LEWIS S. HOYT, OF RIDGEFIELD, CONNECTICUT.

IMPROVEMENT IN STOVE IMPLEMENTS.

Specification forming part of Letters Patent No. 163,659, dated May 25, 1875; application filed March 20, 1875.

*To all whom it may concern:*

Be it known that I, LEWIS S. HOYT, of Ridgefield, in the county of Fairfield and State of Connecticut, have invented a new and valuable Improvement in Stove Implements; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my implement, and Figs. 2, 3, and 4 are views showing its application.

The object of this invention is to obtain an implement by which a pot can be lifted, and its boiling contents emptied, without liability of scalding the hands by the rising steam; and the nature of my invention consists in a hook of peculiar shape, in combination with a broad lip formed on a suitable handle, in such manner as to safely grasp the edge of a pot, and allow it to be tilted and emptied of its contents without exposing the hand holding the implement over the top of the vessel, as will be understood from the following description.

In the annexed drawings, A designates the handle of the implement, and $a$ a hooking-lip, which is formed on this handle, near one end, and on its lower edge. The hook $a$ is directed forward—that is to say, it is directed from the person holding the implement. This hook $a$ and a portion, $b$, leaves a recess, $c$, for receiving the upper edge of a pot, B. (Shown in Fig. 2.) Below and a little in front of the hook $a$ is a broad lip, $d$, which is directed downward. This lip is applied on the inner side of the pot, while the hook $a$ is applied on the outer side of the pot.

When the implement is adjusted on the edge of a pot, as shown in Fig. 2, it is grasped in the right hand, which is now below the upper edge of the pot, outside. The bail C is then held in the left hand, and the pot is tilted and its contents emptied.

In addition to this tilting device, a broad tongue, D, serves as a lifter for a pot-hole cover; and a hook, $g$, in combination with the tongue D, serves as a plate-lifter. For drawing tacks, a notch, $i$, is made in the tongue D.

I am aware that a stove-cover lifter, tack-drawer, plate and dish lifter, pot and kettle lifter have heretofore been combined as a single implement, as shown in Letters Patent of S. Walker, dated December 20, 1864, No. 45,541, and I therefore lay no claim to such invention; but

What I claim as new, and desire to secure by Letters Patent, is—

The improved implement herein described, consisting of the handle A, provided with the hooking-lip $a$, recess $c$, projections $d$ and D, the latter having the notch $i$ and the hook $g$, as a new article of manufacture.

In testimony that I claim the above, I have hereunto subscribed my name in the presence of two witnesses.

LEWIS S. HOYT.

Witnesses:
    FRED. W. GORHAM,
    HIRAM K. SCOTT.